(12) United States Patent
Xu

(10) Patent No.: US 9,771,026 B2
(45) Date of Patent: Sep. 26, 2017

(54) VEHICLE STORAGE CONTAINER

(71) Applicant: FORD GLOBAL TECHNOLOGIES, LLC, Dearborn, MI (US)

(72) Inventor: Tom Xu, Nanjing (CN)

(73) Assignee: Ford Global Technologies, LLC, Dearborn, MI (US)

( * ) Notice: Subject to any disclaimer, the term of this patent is extended or adjusted under 35 U.S.C. 154(b) by 101 days.

(21) Appl. No.: 14/797,744

(22) Filed: Jul. 13, 2015

(65) Prior Publication Data
US 2016/0052454 A1 Feb. 25, 2016

(30) Foreign Application Priority Data

Aug. 21, 2014 (CN) .......................... 2014 1 0416094

(51) Int. Cl.
*B60R 7/00* (2006.01)
*B60R 13/00* (2006.01)
*B60R 7/04* (2006.01)

(52) U.S. Cl.
CPC ..................... *B60R 7/04* (2013.01)

(58) Field of Classification Search
CPC  B60R 7/00; B60R 13/00; B60R 7/043; B60R 2011/0012–2011/0017; B60N 3/004
USPC ........................ 224/275, 926, 281
See application file for complete search history.

(56) References Cited

U.S. PATENT DOCUMENTS

| | | | | |
|---|---|---|---|---|
| 4,917,430 A | * | 4/1990 | Lawrence | B60R 7/04 224/281 |
| 5,088,636 A | * | 2/1992 | Barajas | B60R 11/06 224/281 |
| 5,125,710 A | * | 6/1992 | Gianelo | B60R 9/02 224/281 |
| 5,556,017 A | * | 9/1996 | Troy | B60R 11/0241 224/275 |
| 5,749,554 A | * | 5/1998 | Avila | B60N 3/107 224/281 |
| 5,779,302 A | * | 7/1998 | Geier | B60N 2/4686 297/188.01 |
| 5,865,411 A | * | 2/1999 | Droste | B60N 3/102 224/926 |
| 6,045,173 A | * | 4/2000 | Tiesler | B60N 2/4646 220/813 |
| 6,059,243 A | * | 5/2000 | Hikage | B60N 3/106 248/311.2 |
| 6,161,896 A | * | 12/2000 | Johnson | B60R 7/043 297/188.08 |

(Continued)

FOREIGN PATENT DOCUMENTS

| | | |
|---|---|---|
| DE | 202004011589 | 12/2005 |
| EP | 1854672 | 11/2007 |

(Continued)

*Primary Examiner* — Brian D Nash
(74) *Attorney, Agent, or Firm* — Alice Xu; Mohr IP law Solutions PC

(57) ABSTRACT

One or more embodiments of the present invention relate to a storage container including first, second and third walls, a first panel having first and second sides, the first side being connected to the first wall, and a second panel having third and fourth sides, the third side being connected to the second side, the fourth side being connected to and movable along the second and third walls.

16 Claims, 5 Drawing Sheets

(56) References Cited

U.S. PATENT DOCUMENTS

| | | | |
|---|---|---|---|
| 6,695,375 B1* | 2/2004 | May | B60R 9/00 224/281 |
| 7,240,943 B2* | 7/2007 | Williamson | B60R 7/043 224/275 |
| 7,611,183 B2* | 11/2009 | Burkey | B60N 2/206 296/37.15 |
| 8,011,710 B2 | 9/2011 | Stueber | |
| 8,276,964 B2 | 10/2012 | Werner et al. | |
| 8,960,481 B2* | 2/2015 | Brinas | B60R 7/04 220/531 |
| 9,371,039 B2* | 6/2016 | Xu | B60R 7/04 |
| 2007/0000959 A1* | 1/2007 | Perin | B43L 3/008 224/275 |
| 2007/0241584 A1* | 10/2007 | Williamson | B60R 7/043 296/95.1 |
| 2007/0246495 A1* | 10/2007 | Hague | B60R 5/04 224/281 |
| 2013/0134193 A1* | 5/2013 | Mothersele | B60R 7/00 224/281 |

FOREIGN PATENT DOCUMENTS

| | | |
|---|---|---|
| FR | 2991929 | 12/2013 |
| JP | 2007514599 | 6/2007 |

\* cited by examiner

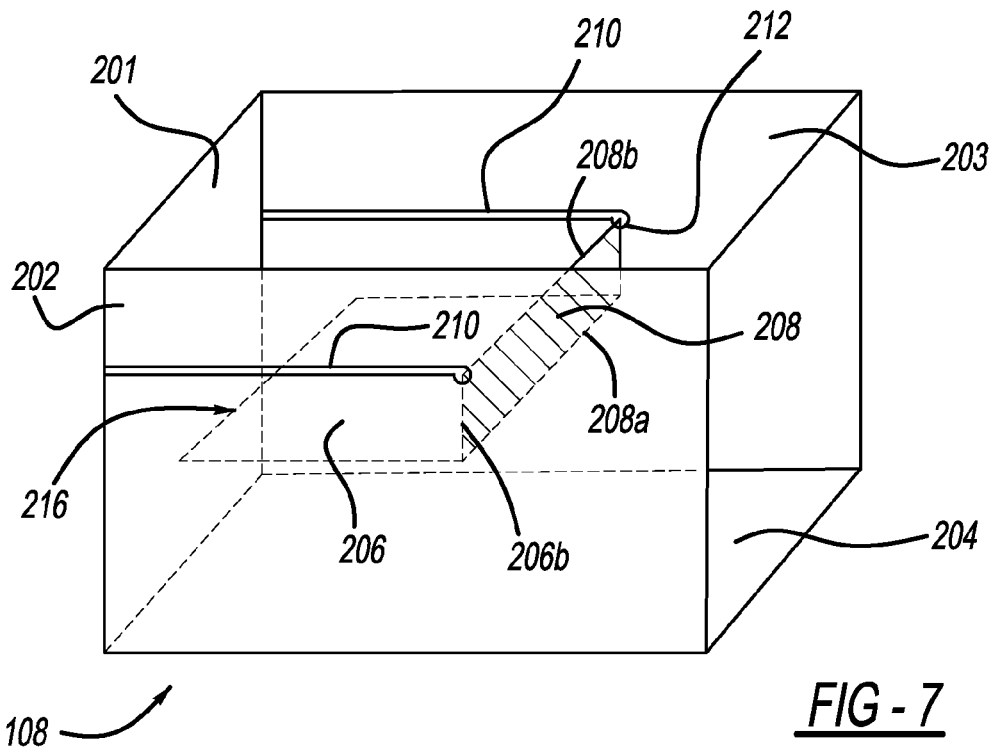
*FIG - 7*
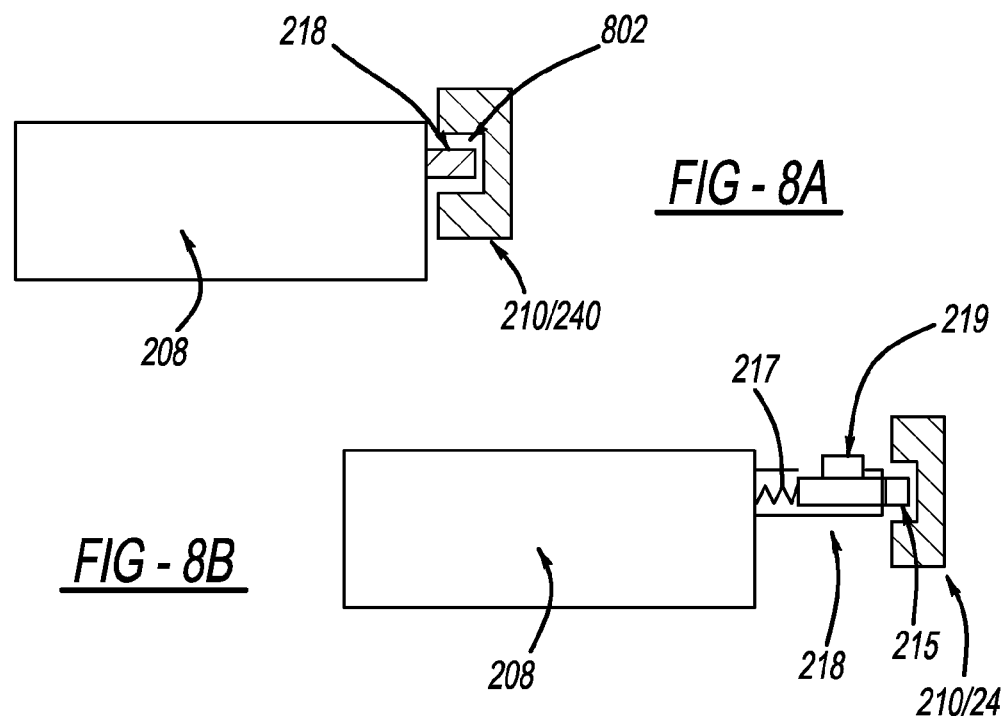
*FIG - 8A*
*FIG - 8B*

VEHICLE STORAGE CONTAINER

RELATED APPLICATION(S)

This application claims the benefit of Chinese New Invention Patent Application No.: CN 201410416094.0, filed Aug. 21, 2014, the entire contents thereof being incorporated herein by reference.

TECHNICAL FIELD

The present invention in one or more embodiments relates generally to storage containers, in particular vehicle storage containers.

BACKGROUND

Vehicles are often provided with storage compartments of various designs to meet certain storage needs. For instance, center console boxes are provided to store different objects.

FR2991929A1 discloses a center console box having a separating board that is laterally movable between two positions.

DE202004011589U1 discloses a glove box and a center console box, wherein a soft sheet is used to provide separation in the box. The soft sheet is connected with a bar which can be moved laterally along a groove in the box, thereby the soft sheet can be unfolded or folded.

SUMMARY

The present invention in one or more embodiments provides a vehicle storage container which is believed to better meet certain storage requriements, and to provide storage spaces with relatively greater convenience and versatility.

According to one aspect of the present invention, a storage container is provided to include: first, second and third walls; a first panel having first and second sides, the first side being connected to the first wall; and a second panel having third and fourth sides, the third side being connected to the second side, the fourth side being connected to and movable along the second and third walls. The first side of the first panel may be connected to the first wall. The first side of the first panel may be connected to the second and third walls.

At a use position, the first panel may extend in a first direction and the second panel may extend in a second direction different from the first direction.

The second and third walls may each include a track to support a gliding movement of the second panel. The track may include a first segment extending in a third direction and a second segment extending in a fourth direction different from the third direction, such that the second panel stops at the second segment and is prevented from moving back via the first segment when at a use position. In some embodiments, the second segment is shorter than the first segment.

The second and third walls each may include first and second connectors positioned spaced apart from each other, the second panel being detachably connected to the first connector at a first use position and to the second connector at a second use position.

At least one of the first and second connectors may be a built-in recess on its respective wall. The first panel may be detachably connected to the second panel. The third side of the second panel may be connected to the second side of the first panel with an elastic member. The second panel may be more rigid at room temperature than the first panel. The first panel may include two parts pivotal about each other. The storage container may be configured as a center console or a part thereof of a vehicle.

The present invention in one or more embodiments is advantageous in at least providing a storage container with relatively simple structure and configuration for storage versatility. Moreover, the objects may be stored in the storage container with ease and certain level of security such that the objects may be effectively prevented from falling outside of their intended storage space within the storage container.

One or more advantageous features as described herein will be readily apparent from the following detailed description of one or more embodiments when taken in connection with the accompanying drawings.

BRIEF DESCRIPTION OF THE DRAWINGS

For a more complete understanding of one or more embodiments of the present invention, reference is now made to the one or more embodiments illustrated in greater detail in the accompanying drawings and described below wherein:

FIG. 7 illustratively depicts another view of the storage container referenced in FIG. 2 to FIG. 6 and FIG. 9;

FIG. 8A and FIG. 8B illustratively depict enlarged, partial cross-sectional views of the storage container referenced in FIG. 2 to FIG. 6 and FIG. 9.

DETAILED DESCRIPTION OF ONE OR MORE EMBODIMENTS

Figure 1:
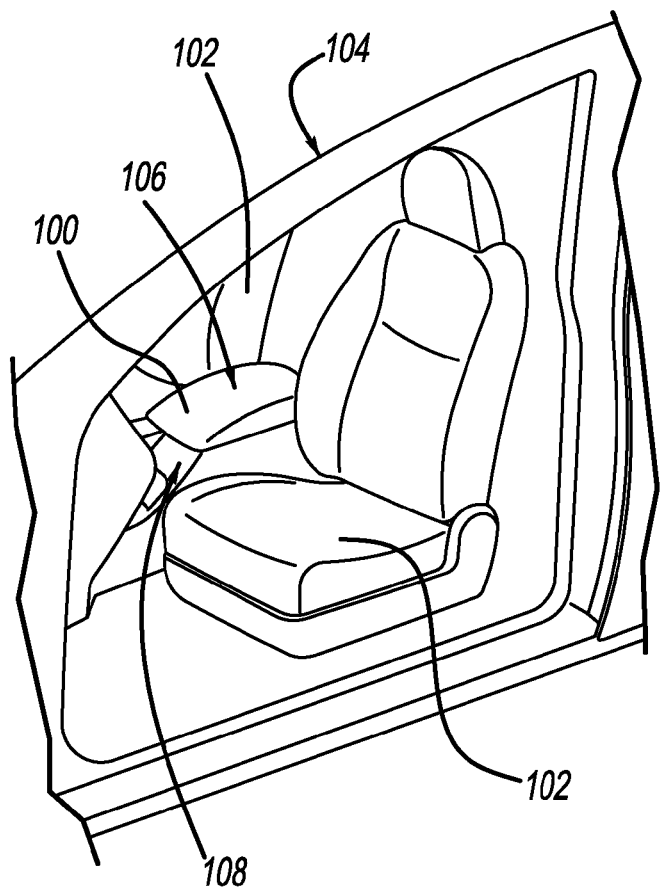
FIG. 1 illustratively depicts a perspective view of a center console in one or more embodiments of the present invention.

As referenced in the FIG.s, the same reference numerals are used to refer to the same components. In the following description, various operating parameters and components are described for different constructed embodiments. These specific parameters and components are included as examples and are not meant to be limiting.

In one or more embodiments, and as illustratively depicted in FIG. 1, a center console generally shown at 100 is shown as positioned between vehicle seats 102 in vehicle 104. The center console 100 includes a container cover 106 and a storage container 108 which is to be described in more detail herein elsewhere. The storage container 108 provides a storage space for storing objects of various sizes with non-limiting examples including electronic products, cups, books, and glasses. As is detailed herein elsewhere, the present invention in one more embodiments provides a relatively more convenient and versatile way of storing objects with variable sizes. For instance, when reaching for objects of relatively smaller dimensions such as a cell phone, one may find it inconvenient to have to search for it within the entire collection of objects positioned there within. In certain instances, a mere lateral partition may not provide stable storage due to unwanted sudden change of motion or vibration. In certain other instances, a particular storage need may arise when the object to be stored is of certain height where a storage space with height or depth may be needed. Features of the storage container are described in more details herein elsewhere.

Figure 2:
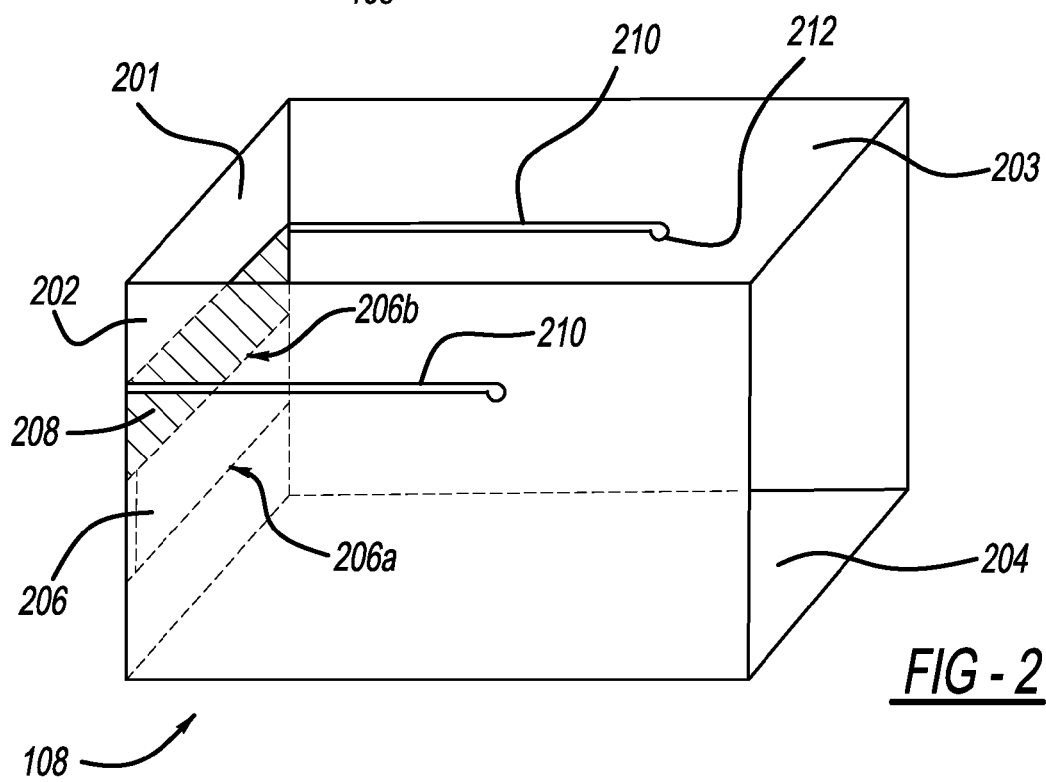
FIG. 2 illustratively depicts an enlarged perspective view of a storage container that may be employed in the center console referenced in FIG. 1, in which a support panel of the storage container is in a retracted position.

FIG. 2 illustratively depicts an enlarged view of the storage container 108 referenced in FIG. 1. For the mere purpose of brevity, the storage container 108 as shown in FIG. 2 is illustratively depicted in the shape of a rectangular cuboid; however, the storage container 108 may include any geometrical variations to a rectangular cuboid, and may even be of other suitable polyhedron shapes such as in the shape of a cube.

Referring back to FIG. 2, the storage container 108 is depicted to include at least a bottom wall 204, a first wall 201, a second wall 202 and a third wall 203, a first panel 206 and a second panel 208 positioned at or near the first wall 201 as in a first or rest position where the first and second panels 206, 208 are retracted for nonuse. As is described herein elsewhere, supported on the second wall 202 and the third wall 203 is a track 210 which provides a non-limiting way for the second panel 208 to move between operating positions in connection with the first panel 206.

Figure 3:
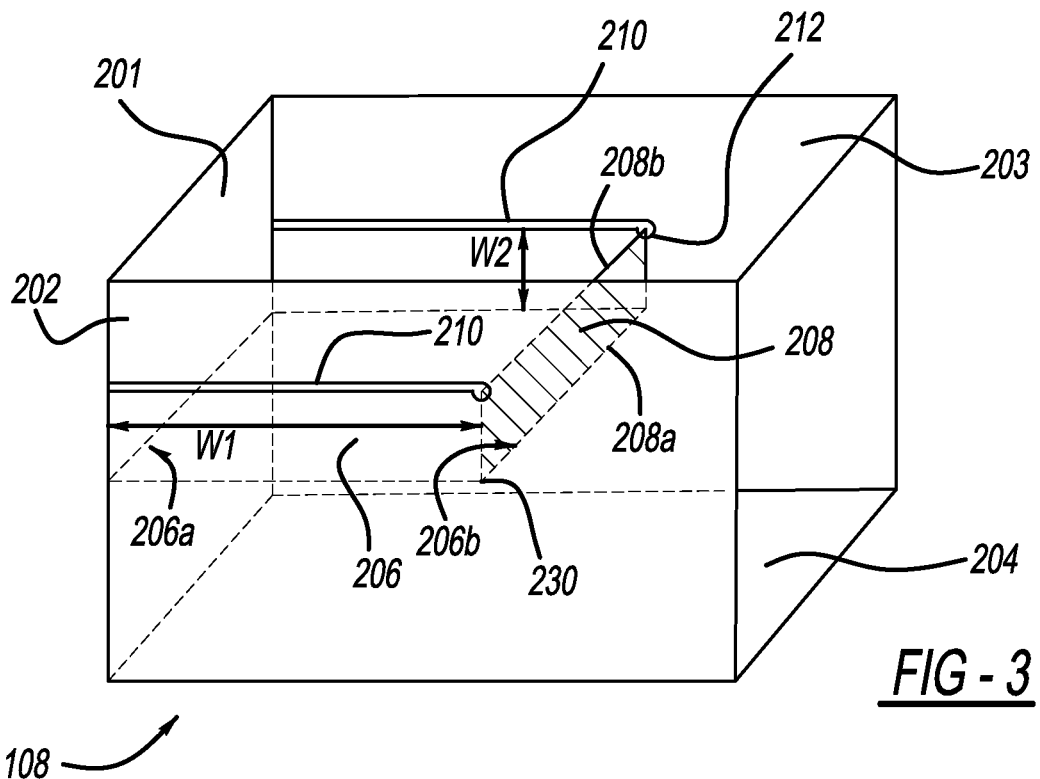
FIG. 3 illustratively depicts another view of the storage container referenced in FIG. 2, in which the support panel is in an open position.

FIG. 3 illustratively depicts another view of the storage container 108 referenced in FIG. 2, wherein the first panel 206 is at a second, open position. In this non-limiting example, the first panel 206 is shown to have a first side 206a and a second side 206b, wherein the first side 206a is connected to the first wall 201 while the second side 206b is connected to the second panel 208. The second panel 208 is shown to include a third side 208a and a fourth side 208b, wherein the third side 208a may be connected with the second side 206b of the first panel 206 and the fourth side 208b may be movably connected with the second wall 202 and the third wall 203.

In the embodiments as shown in FIG. 2 and FIG. 3, the fourth side 208b of the second panel 208 which in comparison to the third side 208a is positioned further away from the first panel 206 is movable along the track 210 on the second wall 202 and the third wall 203. The opposing sides of the second panel 208 that are respectively adjacent to the second wall 202 and the third wall 203 may include a protrusion for moving relative to the track 210. The term "side" of the panel may refer to an edge of the panel or the edge itself plus any suitable portion of the panel extending therefrom. For instance, the sliding movement of the fourth side 208b of the second panel 208 relative to the second wall 202 and the third wall 203 may be carried out via the two ends of the upmost edge of the side 208b being connected with the side walls, or the two ends each with any suitable portion extending from the side 208b.

As illustratively depicted in FIG. 8A and FIG. 8B, the fourth side 208b is shown connected with the side wall 202 and 203 via a connector 218. The connector 218 may be of any suitable positions relative to the fourth side 208b so long as the connector 218 assists with the support and movement of the panel 208 relative to the side walls 202, 203.

In one or more embodiments, and as illustratively depicted in FIG. 3, and at the unfolded or open position, the first panel 206 extends in a first direction "W1", and the second panel 208 extends in a second direction "W2" different from the first direction "W1." The first direction "W1" and the second direction "W2" may form an angle of about 45 to 135 degrees relative to each other, in particular 75 to 120 degrees.

For the mere purpose of brevity, the storage container 108 is described herein in its relation to the center console 100. However, the storage container 108 may be employed anywhere in the vehicle 104 as necessary and suitable, where storage space along with ease of access thereto is desirable.

Figure 6:
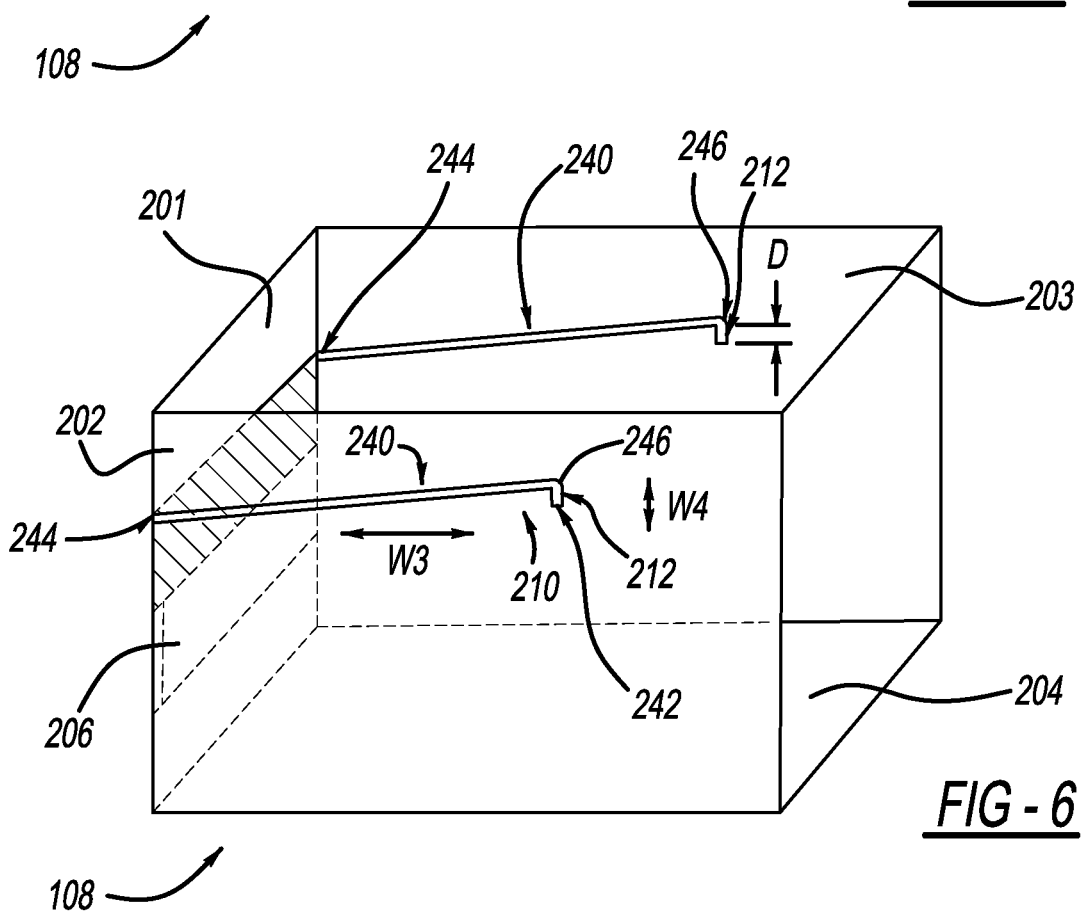
FIG. 6 illustratively depicts another view of a track unit of the storage container referenced in FIG. 2 and FIG. 3.

Referring to FIG. 6, the track 210 may include a first segment 240 extending in a third direction "W3" and a second segment 212 extending in a fourth direction "W4" different from the third direction "W3." The second segment 212 functions as a positional lock-in device. The fourth direction or alternatively an extending direction "W4" of the lock-in device 212 is different from the third direction or alternatively another extending direction "W3" of the main portion or the first segment 240 of the track 210 such that further movement the second panel 208 along the third direction "W3" may be terminated at the second segment 212 which favorably retards any unwanted back movement of the second panel 208. By adopting such a design, for instance when an object is placed on the first panel 206, unwanted back movement of the second panel 208 toward the first wall 201 may be effectively retarded or prevented. The second panel 208 is advantageously present to reduce the likelihood of stored objects from being accidentally falling off due to movement or vibration. More than one track 210 and more than one lock-in device 212 per track 210 may be employed as necessary, wherein the lock-in device 212 may be of any suitable forms and shapes as indicated herein elsewhere.

The second segment 212 may be substantially shorter than the first segment 240. Moreover, the first segment 240 may be slanted such that an end point 246 of the first segment 240 is presented with an elevation distance "D" relative to another end point 244 of the first segment 240. Accordingly, and when the total length of the second segment 212 equals the elevation distance "D", an end point 242 of the second segment 212 is on the same elevation plane with the end point 244. Therefore, the second panel 208 may move upward and rightward to reach its extended position from the position shown in FIG. 2 to the position shown in FIG. 3. Because of the elevation distance "D", the extended position of the second panel 208 is relatively stablized.

Figure 4:
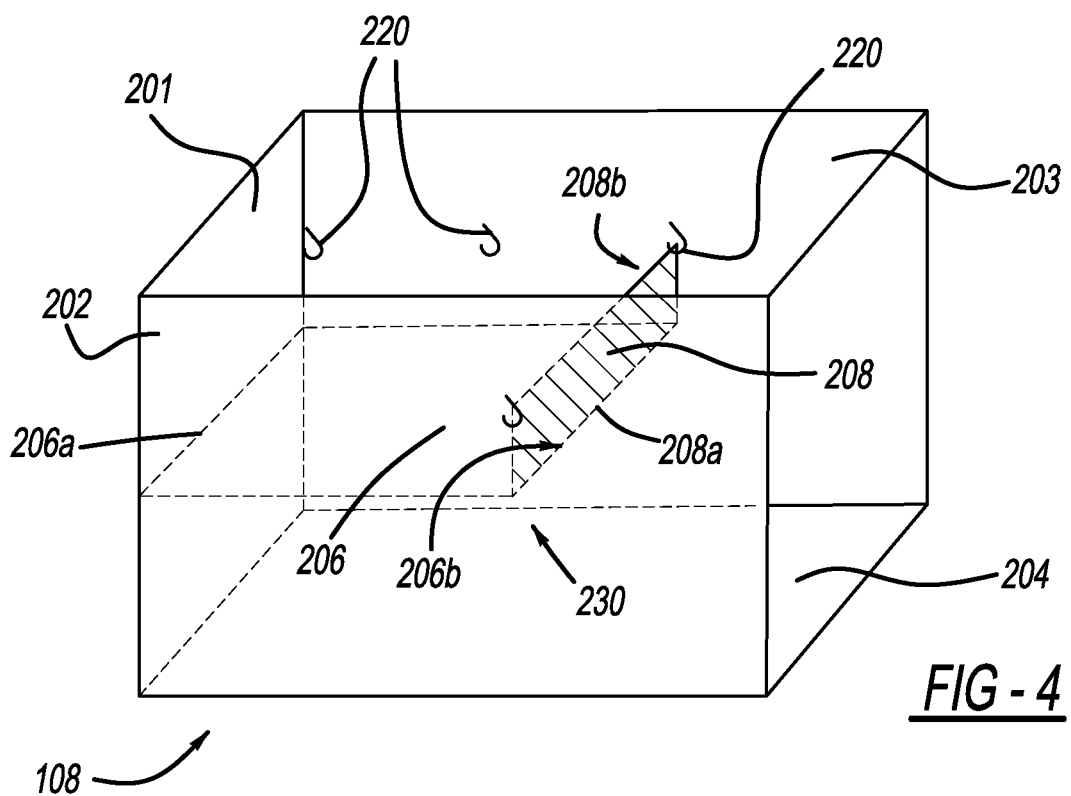
FIG. 4 illustratively depicts another enlarged perspective view of a storage container that may be employed in the center console referenced in FIG. 1, wherein a support panel of the storage container is in an open position.

FIG. 4 illustratively depicts a design that is alternative to the storage container 108 referenced in FIG. 2. Similar to the embodiment shown in FIG. 2, the storage container 108 includes at least a bottom wall 204, a first wall 201, a second wall 202 and a third wall 203. As illustratively depicted in FIG. 3, the first panel 206 and the second panel 208 are located near the first panel, and the second and third walls 202, 203 are provided with a connector 220. Again and similar to what is detailed in reference to FIG. 2, the first panel 206 has a first side 206a and a second side 206b, where the first side 206a is connected to the first wall 201 and the second side 206b is connected to a first side 208a of the second panel 208. The second panel 208 is detachably connected to the second wall 202 and the third wall 203 via a connector 220. For instance, the second side 208b of the second panel 208 may have connectors 220 at both ends, or the two edges of the second panel 208 adjacent to the second and third wall 202, 203 may both be provided with connectors 220. As mentioned herein elsewhere in relation to FIG. 3, the term "side" of the panel may refer to an edge of the panel or the edge itself plus any suitable portion of the panel extending therefrom.

Although the connector 220 in FIG. 4 is illustratively depicted as hooks, the connector 220 may be of any suitable shapes and materials, with non-limiting examples thereof including hooks, buckles, and adhesives. Alternatively connector 220 may be replaced with a built-in recess positioned on the second wall 202 and the third wall 203, and accordingly the second panel 208 may be provided with protrusions which are receivable within the built-in recess for engagement and movement.

As illustratively depicted in FIG. 8A, the connector 218 is a protrusion that may be received within a recess 802 of the track 210 or the first segment 240 of the track 210. The connector 218 in the form of a protrusion helps to guide the movement of the second panel 208 to reach its desirable operating positions. Alternatively, and as illustratively depicted in FIG. 8B, the connector 218 may include a compressible spring 217 and a protrusion 215 positioned next to the spring 217. The protrusion 215 may further include a button 219, wherein a user may cause the protrusion 215 to move toward the spring by pushing the button 219 so as to temperorily retract the protrusion 215 until a desirable operating position is reached. The protrusion 215 may be locked in the recess 802 of the second wall 202 and/or the third wall 203. More than one connector 218 may be employed to improve connection of the second panel 208.

Figure 5:
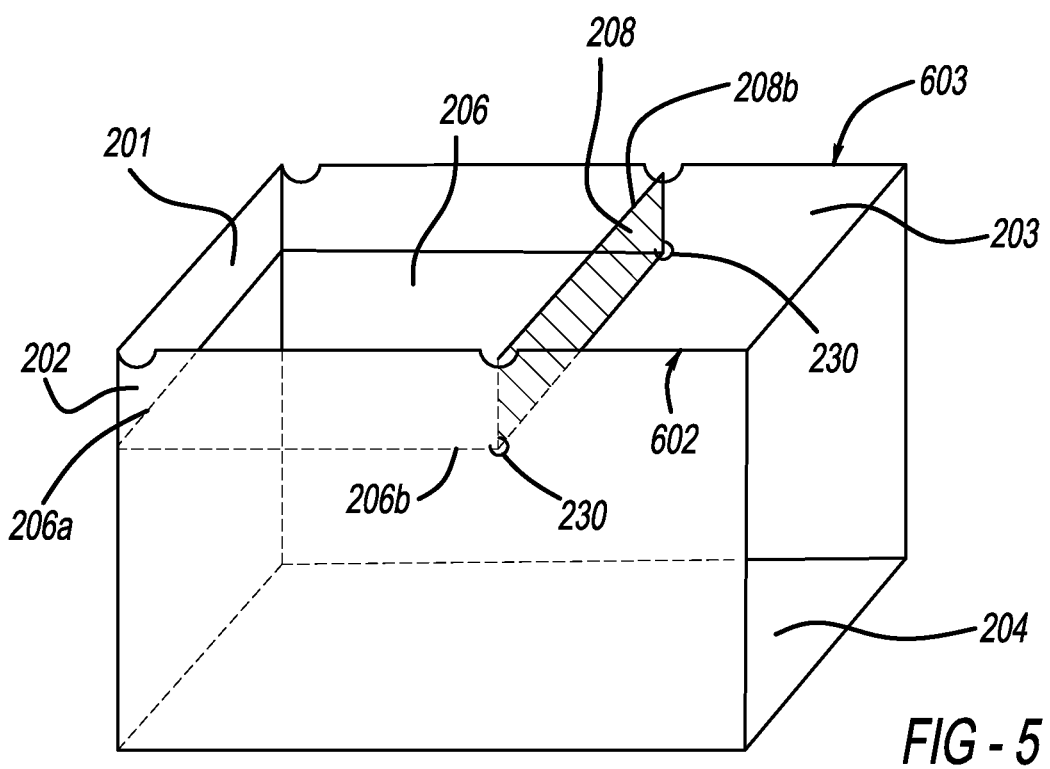
FIG. 5 illustratively depicts yet another enlarged perspective view of a storage container that may be employed in the center console referenced in FIG. 1, wherein a support panel of the storage container is in an open position.

FIG. 5 illustratively depicts another alternative view of the storage container 108 referenced in FIG. 1. Similarly, the storage container 108 includes at least the bottom wall 204, the first wall 201, the second wall 202 and the third wall 203. The first panel 206 and the second panel 208 are shown in FIG. 5 as being in a deployed, use position, wherein the first side 206a of the first panel 206 is connected to the side wall 201, the second side 206b is connected to the third side 208a of the second panel 208. The fourth side 208b of the second panel 208 is connected at its both ends each to a recess 602 and a recess 603 respectively positioned on the side walls 202, 203. Therefore, a variable storage space may be realized without the need for additional connectors. Where the edges 602, 603 are each part of the outer edge of the second and third walls 202, 203 that at least comes in contact with the console cover 106 when the center console 100 is covered with the console cover 106.

To better connect the second panel 208, and in view of FIG. 3, FIG. 4, FIG. 5, FIG. 7 and FIG. 9, a lock-in device 230 may be provided at an intersection of the first and second panel 206, 208. The lock-in 230 may be one or more of the connectors mentioned herein elsewhere, for instance hooks, buckles, and adhesives. Alternatively, the lock-in device 230 may be in the form similar to that of the connector 218 referenced in FIG. 8.

The first panel 206 may be connected to side walls via any suitable forms of connections. For instance, as depicted in FIG. 7, the first side 206a of the first panel 206 may be directly or indirectly connected to the first wall 201 via any suitable connections, or it may be directly or indirectly connected to the second wall 202 and third wall 203 at a location adjacent to the first wall 201 via any suitable connections. Alternatively and as illustratively shown in FIG. 7, the first panel 206 may be provided with a supporting bar 216 at the first side 206a and two ends of the supporting bar 216 may be connected to the second and third wall 202, 203 at a position adjacent to the first wall 201. The first side of the first panel 206 may not necessarily be directly connected to any of the side walls 201, 202, 203. For instance, at a non-use or rest position, the first panel 206 may be retracted along with the second panel 208, which is connected to the first panel 206, to be at or near the side wall 201.

The first panel 206 may be connected to the second panel 208 via any suitable forms of connections. The first panel 206 may be fixed to the second panel through for instance sewing, binding, heat forming. Alternatively the first panel 206 may be connected to the second panel 208 via elastic or non-elastic connectors. The connectors may include but not limit to hooks, buckles, adhesive agents, elastic strings, rubber bands, or elastic net.

In one or more embodiments, the first panel 206 may be less rigid than the second panel 208 under room temperature. In such embodiments, the first panel 206 with a lower rigidity may provide mobility and conformity to various objects to be placed thereupon, and may reduce vibration noise. The first panel 206 may be flexible and foldable, and may be formed of any suitable materials with non-limiting examples including fabrics, lether and soft polyvynilcloride plastics. In contrast, the second panel 208 may be formed by relatively more rigid materials such as hard polyethylene, polypropelene plastic panels.

Figure 9:
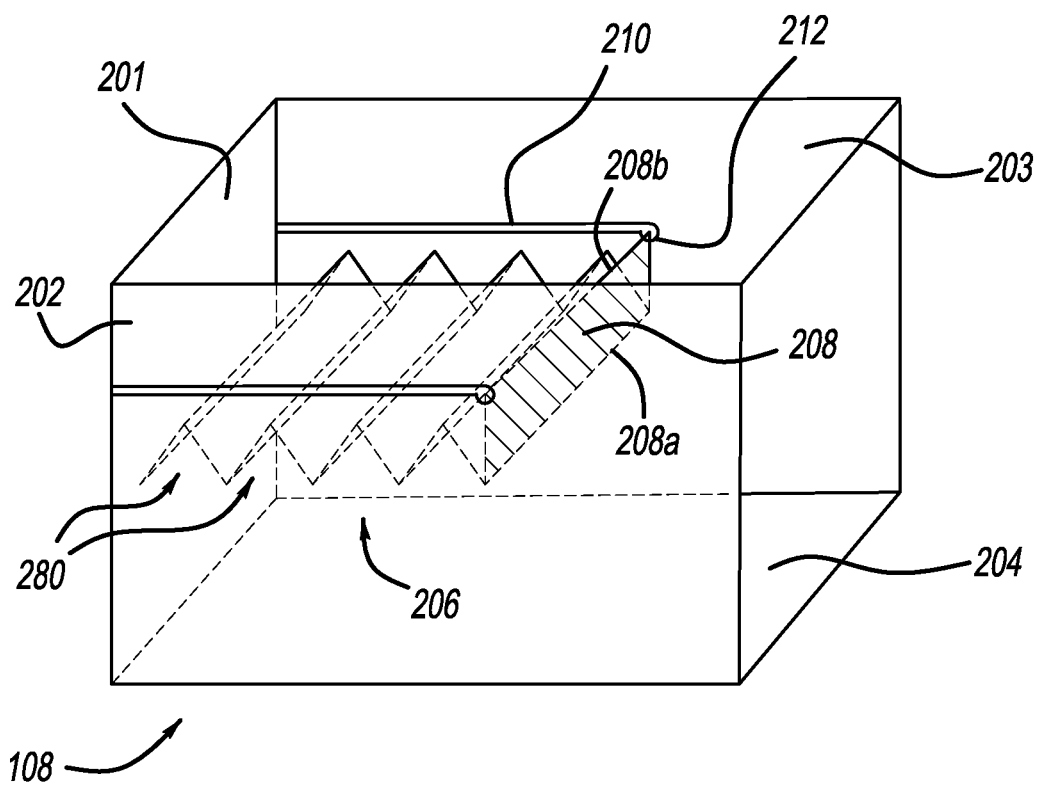
FIG. 9 illustratively depicts yet another view of the storage container referenced in FIG. 2 to FIG. 7.

However, the first panel 206 may not necessarily be less rigid than the second panel 208. FIG. 9 illustratively depicts another view of the first panel 206. In view of FIG. 9, the first panel 206 may be foldable, such that desirable flexibility of the first panel 206 may be realized via its foldability. In particular, the first panel 206 may include two or more portions pivotable about one or more pivot axis 280, whereby different usage positions may be realized accordingly. For instance, the first panel 206 may be folded and retracted at or near the first wall 201 or be fully extended along with the second panel 208. As mentioned herein elsewhere, more than one pivot axis 280 may be provided. In other words, the first panel 206 may include two or more portions that are pivitable or folded relative to one another.

One or more embodiments of the present invention are described in the context of a vehicle storage container and in particular the center console of the vehicle. The present invention may be applied in various storage spaces in the vehicle, such as a glove box. Additionally, one or more embodiments of the present invention may also be applied in other designs where a variable storage space is desirable, for instance, airplanes, ships, furnitures, thereby to provide storage spaces that are variable and versatile.

In one or more embodiments, the present invention as set forth herein is believed to have overcome certain challenges associated with article storage within a vehicle compartment. However, one skilled in the art will readily recognize from such discussion, and from the accompanying drawings and claims that various changes, modifications and variations can be made therein without departing from the true spirit and fair scope of the invention as defined by the following claims.

What is claimed is:

1. A storage container attached to a vehicle, comprising: first, second and third walls;
a first panel including first and second sides, the first side being disposed proximate to the first wall; and
a second panel including third and fourth sides, the third side being flexibly connected to the second side, the fourth side being detachably connected to and movable along the second and third walls, and
wherein:
at a use position, the first panel extends in a first direction and the second panel extends in a second direction different from the first direction,
the second and third walls each include a track to support a gliding movement of the second panel,
the track includes a first segment extending in a third direction and a second segment extending in a fourth direction different from the third direction, such that the second panel stops at the second segment and is prevented from moving back via the first segment when at the use position, and
the second segment is shorter than the first segment.

2. The storage container of claim 1, wherein the first side of the first panel is detachably connected to the first wall.

3. The storage container of claim 1, wherein the first side of the first panel is detachably connected to the second and third walls.

4. The storage container of claim 1, wherein the second and third walls each include first and second connectors positioned spaced apart from each other, the second panel being detachably connected to the first connector at a first use position and to the second connector at a second use position.

5. The storage container of claim 4, wherein at least one of the first and second connectors is a built-in recess on its respective wall.

6. The storage container of claim 1, wherein the first panel is detachably connected to the second panel.

7. The storage container of claim 1, wherein the third side of the second panel is connected to the second side of the first panel with an elastic member.

8. The storage container of claim 1, wherein the second panel is more rigid at room temperature than the first panel.

9. The storage container of claim 1, wherein the first panel includes two parts pivotal about each other.

10. A storage container attached to a center console of a vehicle, comprising:
first, second and third walls;
a first panel including first and second sides, the first side being disposed proximate to the first wall; and
a second panel including third and fourth sides, the third side being flexibly connected to the second side, the fourth side being detachably connected to and movable along the second and third walls.

11. The center console of claim 10, wherein the first side of the first panel is detachably connected to the first wall, the second and third walls, or both.

12. The center console of claim 10, wherein at least one of the second and third walls includes a track to support a movement of the second panel, wherein the track includes a first segment extending in a third direction and a second segment extending in a fourth direction different from the third direction, such that the second panel stops at the second segment and is prevented from moving back via the first segment when at a use position.

13. The center console of claim 10, wherein the first panel is detachably connected to the second panel.

14. The center console of claim 10, wherein the second panel is more rigid at room temperature than the first panel.

15. The center console of claim 10, wherein the first panel includes two or more foldable parts.

16. A storage container attached to a vehicle, comprising:
first, second and third walls;
a first panel including first and second sides, the first side being disposed proximate to the first wall; and
a second panel being more rigid than the first panel at atmospheric temperature and including third and fourth sides, the third side being detachably connected to the second side, the fourth side being detachably connected to and movable along the second and third walls.

* * * * *